(12) United States Patent
Betzler et al.

(10) Patent No.: US 12,093,959 B2
(45) Date of Patent: *Sep. 17, 2024

(54) SYSTEM AND METHOD FOR ENFORCING GRANULAR PRIVACY CONTROLS DURING TRANSACTION FRAUD SCREENING BY A THIRD PARTY

(71) Applicant: INTERNATIONAL BUSINESS MACHINES CORPORATION, Armonk, NY (US)

(72) Inventors: Boas Betzler, Waldenbuch (DE); Petra S. Buehrer, St. Leon (DE); Tim U. Scheideler, Schoenenberg (CH); Matthias Seul, Kassel (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1197 days.

This patent is subject to a terminal disclaimer.

(21) Appl. No.: 15/806,368

(22) Filed: Nov. 8, 2017

(65) Prior Publication Data
US 2019/0095923 A1 Mar. 28, 2019

Related U.S. Application Data

(63) Continuation of application No. 15/715,370, filed on Sep. 26, 2017.

(51) Int. Cl.
*G06Q 20/40* (2012.01)
*G06F 21/52* (2013.01)
*G06F 21/62* (2013.01)
*G06Q 20/02* (2012.01)
*H04L 9/40* (2022.01)

(52) U.S. Cl.
CPC ......... *G06Q 20/4016* (2013.01); *G06F 21/52* (2013.01); *G06F 21/6254* (2013.01); *G06Q 20/02* (2013.01); *G06Q 20/4014* (2013.01); *H04L 63/1408* (2013.01)

(58) Field of Classification Search
CPC ................................................ G06Q 20/4016
See application file for complete search history.

(56) References Cited

U.S. PATENT DOCUMENTS

| 8,005,737 B2 * | 8/2011 | Hammad | G06Q 20/382 705/35 |
| 8,812,351 B2 | 8/2014 | Zollino et al. | |
| 9,460,311 B2 | 10/2016 | Bezzi et al. | |

(Continued)

OTHER PUBLICATIONS

Appendix P, List of IBM Patents or Patent Applications Treated as Related dated Nov. 8, 2017.

(Continued)

*Primary Examiner* — John W Hayes
*Assistant Examiner* — Zehra Raza
(74) *Attorney, Agent, or Firm* — Cantor Colburn LLP; Anthony Mauricio Pallone

(57) ABSTRACT

Methods, computer program products, and systems are presented. The methods include customer specific information exchange and an adjustment of the privacy level of this information. For this purpose an abstraction layer and an obfuscation module are introduced. Using a "fraud vector" a risk assessment is performed on the obfuscated transaction data.

5 Claims, 10 Drawing Sheets

(56) References Cited

U.S. PATENT DOCUMENTS

| | | |
|---|---|---|
| 2014/0040134 A1 | 2/2014 | Ciurea |
| 2015/0073954 A1 | 3/2015 | Braff |
| 2015/0317613 A1 | 11/2015 | Clark |
| 2016/0105776 A1* | 4/2016 | Ruff .................. H04L 47/70 370/312 |
| 2017/0353423 A1* | 12/2017 | Morrison ............. G06F 16/951 |

OTHER PUBLICATIONS

Betzler et al., "System and Method for Enforcing Granular Privacy Controls During Transaction Fraud Screening by a Third Party"; U.S. Appl. No. 15/715,370, filed Sep. 26, 2017.
Gallego et al., "An Empirical Case of a Context-aware Mobile Recommender System in a Banking" 2012 Third FTRA International Conference on Mobile, Ubiquitous, and Intelligent Computing, p. 1-8; Environment.

* cited by examiner

301 Original Transaction Data

302 Customer: #341432424
Handler: HSG International Finance

303 From:
Account #321323324525575
Bank: IBAN BZLADE0001

304 To:
Account #432768797454543
Bank: IBAN BZODE4011

305 Amount: 1000,00€
Subject: Order Ref BGI5555-1023
Execute: Immediately

Fig. 3

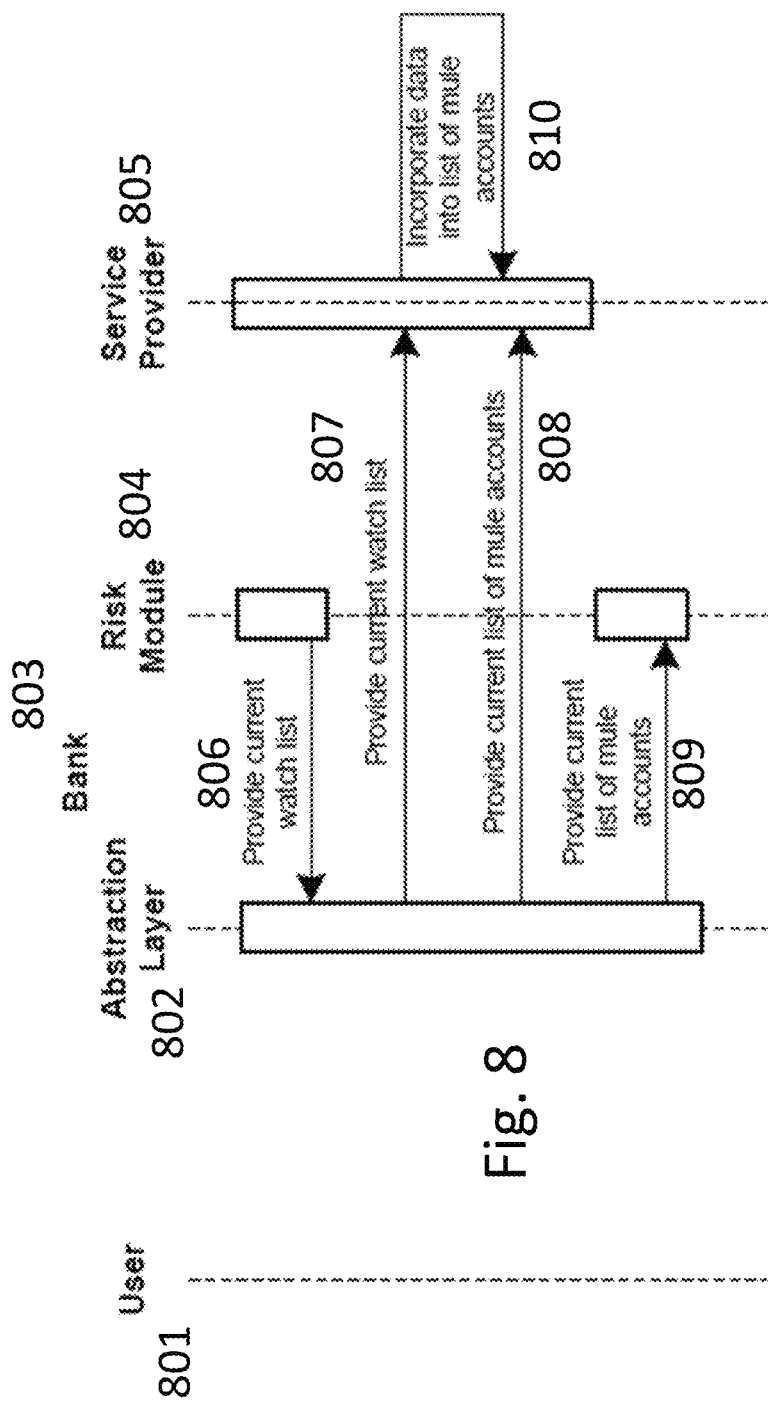

SYSTEM AND METHOD FOR ENFORCING GRANULAR PRIVACY CONTROLS DURING TRANSACTION FRAUD SCREENING BY A THIRD PARTY

DOMESTIC PRIORITY

This application is a continuation of U.S. patent application Ser. No. 15/715,370, filed Sep. 26, 2017, the disclosure of which is incorporated by reference herein in its entirety.

BACKGROUND

The present disclosure relates to an information exchange between banks and financial service providers to detect fraudulent financial transactions. Web fraud protection is used to prevent and detect account takeover initiated by malware and phishing. It is especially relevant when mobile devices are used, which are mostly not secured to the extend workstations are.

To protect end users is very challenging for enterprises like banks as devices owned by customers are out of their control and thus the weak link. Transaction security service providers (hereinafter referred to as Service Providers or SP) provide clientless software, transparent to the end☐users, in order to secure money transfers. In order to do so a lot of information is transferred to these service providers, some is less, some is more sensitive. For instance information about transactions (TA) to new payees or extraordinary high amounts of money is sent to the service providers (like timestamp, geo location, device ID, etc.). This is done being able to identify so called mule accounts with the help of the information received not only by one bank but by multiple banks, as the service providers save information about unmasked criminal devices and identified mule accounts into a central database.

SUMMARY

According to the present invention, a transactional system comprises a risk module to determine and provide actionable risk assessments for transactions requested by a user. The risk module may be configured to negotiate between security and privacy needs by uncovering risk relevant data only if needed for risk assessment and if permitted by the user, requesting consent or aborting the transaction if too much information might be exposed.

Also according to the present invention, a method to handle transactions utilizes a risk module to determine and provide actionable risk assessments for transactions requested by a user. The risk module may be configured to negotiate between security and privacy needs by uncovering risk relevant data only if needed for risk assessment and if permitted by the user, requesting consent or aborting the transaction if too much information might be exposed.

BRIEF DESCRIPTION OF THE DRAWINGS

A more complete understanding of the present invention may be obtained by reference to the following detailed Description of Exemplary Embodiments of the Invention, when taken in conjunction with the accompanying Drawings, wherein:

FIG. 3 shows a diagram of an example of a sample of transaction data according to an embodiment of the present invention;

FIG. 8 shows a diagram of an example of an exchange and update of a watch list according to an embodiment of the present invention.

DETAILED DESCRIPTION

Figure 1:
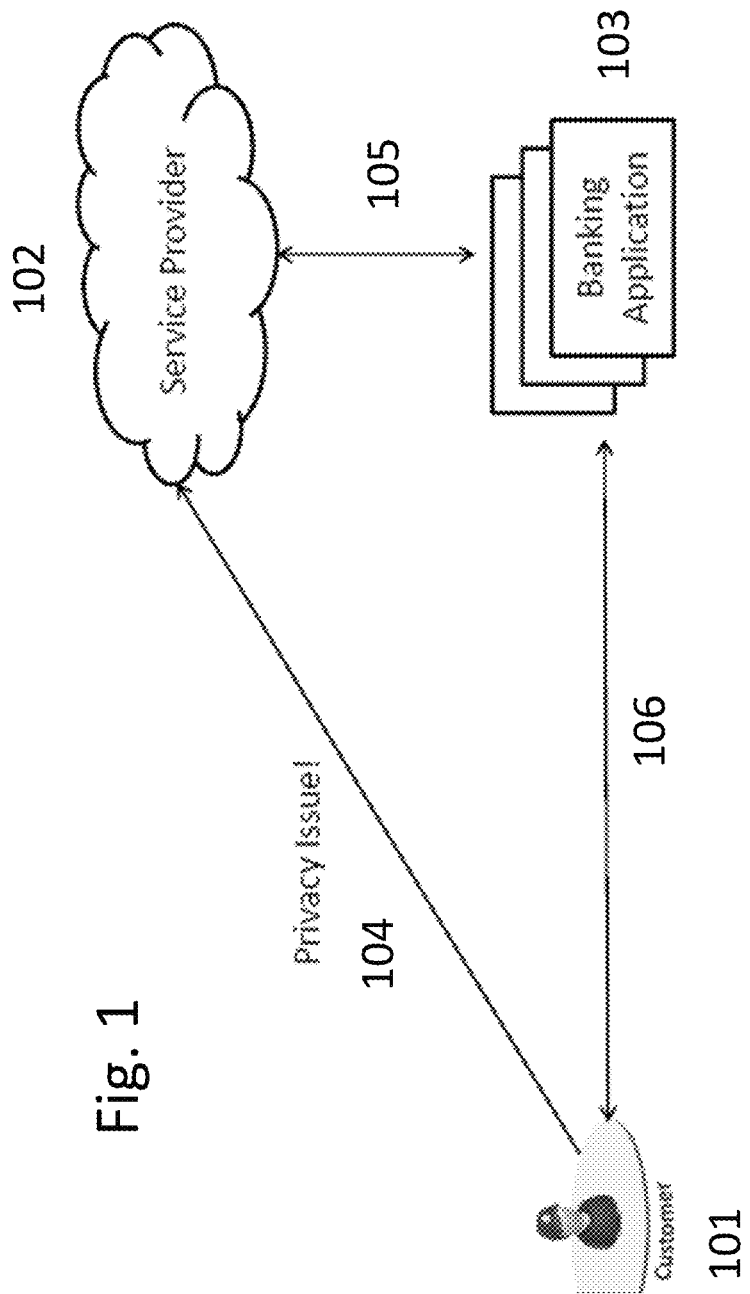
FIG. 1 shows a diagram of an example of a data flow as in prior art.

Embodiments of the invention will now be described more fully with reference to the accompanying drawings. The invention may, however, be embodied in many different forms and should not be construed as limited to the embodiments set forth herein. The invention should only be considered limited by the claims as they now exist and the equivalents thereof.

According to embodiments of the present invention, a transactional system further comprises an obfuscation module configured to negotiate between security needs and privacy needs and determining which data to expose to third parties.

According to these or further embodiments of the present invention the obfuscation module may be configured to obfuscate data by at least one of the following actions:
complete removal of data point;
replacement of data with random data of the same type;
Replacement with generalized information;
replacement with pseudo-anonymized information;
or not to obfuscate data, depending on security needs and privacy needs of parties involved in the transaction.

According to these or further embodiments of the present invention, the transactional system further comprises a transparent abstraction layer to capture and modify transactions.

According to these or further embodiments of the present invention, the transactional system further comprises a transparent abstraction layer to capture and modify transactions and to communicate security needs and privacy needs between a user, the risk module or third parties.

According to these or further embodiments of the present invention, the method further utilizes an obfuscation module configured to negotiate between security needs and privacy needs and determining which data to expose to third parties.

According to these or further embodiments of the present invention, the obfuscation module is configured to obfuscate data by at least one of the following actions:

complete removal of data point;
replacement of data with random data of the same type;
replacement with generalized information;
replacement with pseudo-anonymized information;
or not to obfuscate data, depending on security needs and privacy needs of parties involved in the transaction.

According to these or further embodiments of the present invention, the method further utilizes a transparent abstraction layer to capture and modify transactions.

According to these or further embodiments of the present invention, the method further utilizes a transparent abstraction layer to capture and modify transactions and to communicate security needs and privacy needs between a user, the risk module or third parties.

Embodiments of the invention transparently extend existing transactional systems (typically used in banking environments) to allow on-the-fly risk analyses with dynamic protection of customer privacy.

To this end, embodiments of the invention propose the introduction of up to three technical components into the existing transaction system of a bank.

1. A transparent abstraction layer to capture and modify transactions without changes to the existing system;
2. An obfuscation module able to negotiate between security and privacy needs both through automatic or manual means interacting with the different parties of the transaction;
3. A risk module to determine and provide actionable risk assessments "fraud vector" without the need to expose actual customer data.

In the context of the present description of embodiments of the invention and claiming the present invention the term transaction denominates a process or a group of processes to arrive at an agreement between at least two parties and/or to execute one or more provisions of such an agreement. Important examples of such transactions are financial transactions, business transactions of legal transactions. The parties involved may e.g. be banks, companies, customers, suppliers. In this description, the term bank is occasionally used to denominate some kind of institutional party of a transaction.

In this context a risk denominates the potential (i.e. a possibility or probability) to lose some kind of valuable asset, e.g. a certain amount of money, a financial claim or a legal position. A risk assessment in this context denominates a process of estimation or determination of a risk associated with (part of) a transaction or the result of such a process, e.g. an estimated probability of loss or damage, e.g. financial loss or legal damage, etc.

In this context an actionable risk assessment denominates a result of a risk assessment process, which may be operationalized in the framework of information processing, i.e. which may be used by an algorithm or in a process to complete or abort a transaction. A negotiation between security and privacy needs by uncovering risk relevant data only if needed for risk assessment and if permitted by a party of a transaction (e.g. the user) is an important example of a process used to assess and, where appropriate to minimize or reduce a risk associated with a transaction. This may be achieved by requesting consent or aborting the transaction if too much information might be exposed, i.e. if the information requested or required by a first party of the transaction exceeds the amount or kind of information a second party of this transaction is prepared to expose to the first party or third parties (e.g. an information provider).

The term transparent abstraction layer to capture and/or modify transactions in this context refers to an optional module of a transactional system. This module is called transparent because it performs in a transparent mode, i.e. without changes to the existing system that might be noticeable by a user of the system. This abstraction layer captures a transaction in the sense that it maintains the connection and communication with the user while the transaction is processed by the system, e.g. while risk assessment and other processes may be executed.

The present invention may contribute to improve the privacy of customers while ensuring the predetermined security level. By using the AL to intercept transactions, using the OM to apply rules-based obfuscation of data and finally using the RM to perform an in-depth risk analysis resulting in a generalized Fraud Vector, embodiments of the invention are able to ensure transactions are properly screened for fraud without surrendering the customer's data. Customer data may be protected using a granular approach, uncovering more data as needed/permitted, requesting consent or aborting the transaction if too much information might be exposed. Bank interests may be protected as it is provided with the actionable information and evaluation it can use to determine if a given transaction is permissible. As most of the data is just a means to arrive at a certain risk rating, reducing the information transmitted to this specific delivery allows faster, more privacy-conscious screening without losing precision.

FIG. 1 shows the data exchange in existing banking systems. The customer 101 and potential data 104, 105, 106 are flowing between the banking application 103 and additional 3rd-party providers. The data flow can be directly from the customer to the 3rd-party service provider 102 or relayed through the banking application.

Figure 2:
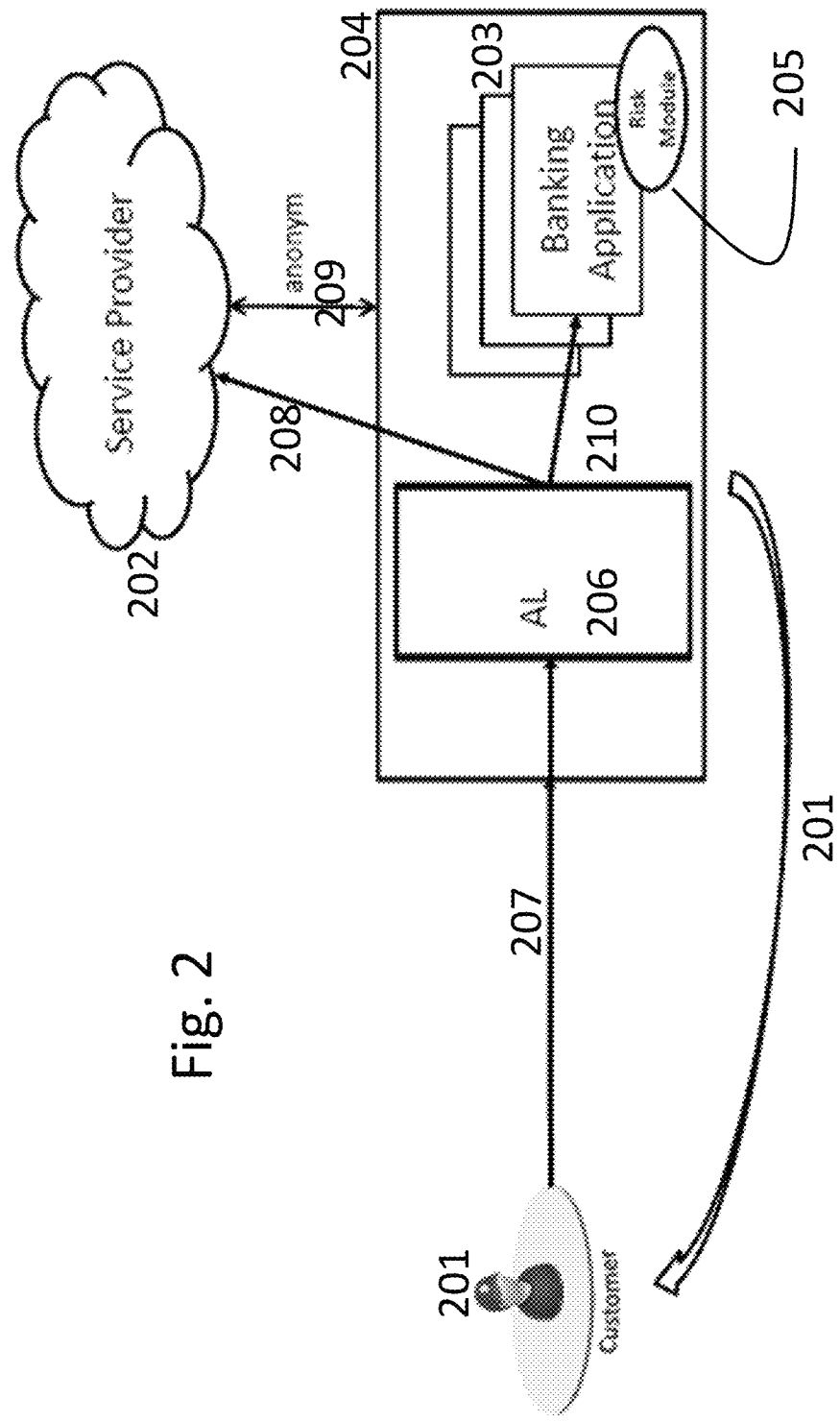
FIG. 2 shows a diagram of an example of a data flow using an embodiment of the abstraction layer according to an embodiment of the present invention.

FIG. 2 shows an example of a data flow using an embodiment of the abstraction layer 206 according to an embodiment of the present invention. The Abstraction Layer 206 may intercept the incoming transaction 207 and hand it over 208, 209, 210 for processing via the other modules 202, 203, 205. According to an embodiment of the invention which may be referred to as the "Abstraction Layer Intercept" concept, the Abstraction Layer (AL) 206 is placed between the customer 201 and all other participating parties.

According to another embodiment of the system of the invention is integrated into a banking application and the banking application handles all incoming traffic and relays requests to the service provider. The abstraction layer and all other components may be used to moderate the interaction with the service provider without the need to change the banking system.

According to another embodiment of the invention, which may be called "External Service", the system of the invention is not integrated into the banking application and does not possess an abstraction layer. Instead the banking system is directly interacting with the risk module/obfuscation module.

Figure 2A:
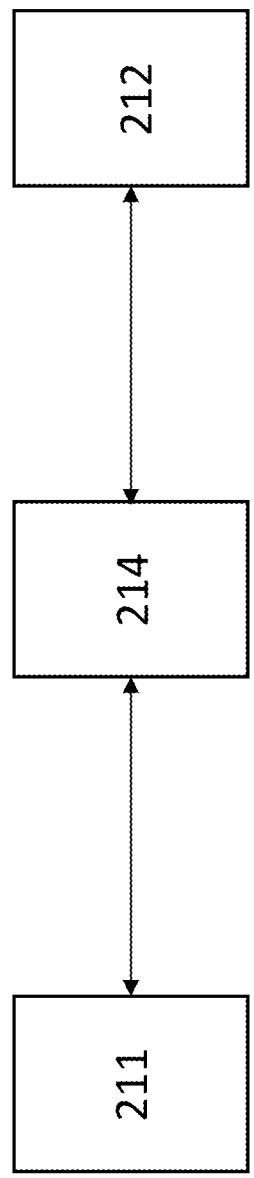
FIG. 2a shows the components of a data processing system according to an embodiment of the present invention.

In the following, a possible component description/workflow overview is given, especially with reference to FIG. 2a. The Abstraction Layer (abbreviated as AL), intercepting a transaction, may be implemented as a software running on a hardware 214 of the bank or as a hardware component of the hardware 214 of the bank and the AL preferably functions as a (semi-) transparent middleware between the different parties, i.e. the client hardware 211 and the service provider hardware 212. It may do this by being used as a transparent filtering proxy in the data stream between the different endpoints. The AL may react to new incoming transactions from the client hardware 211 and capture them for processing. To the connecting client 211 the AL may either send no response until it has finished processing, send responses that indicate the client 211 should wait or send responses that signal acceptance of the transaction if the client may check separately if the transaction succeeded. The default behavior is not to send responses until the AL has finished processing.

Depending on the transaction trust setup the AL may have a database of certificates and keys it can use to authenticate with connecting clients as the banking system, decrypt transactions as well as sign responses with a system certificate the client trusts. The AL may use indicators such as client ID, client certificate connecting network and other indicator of the incoming transaction to determine which certificate/key to use. The AL may have a database of known transaction types that allows it to map the individual data points (like customer number, account number, transaction id, value of transaction, description, etc.) that may have specific naming dependent on the client to a generic data set. This allows the AL to understand and translate between specific transactions to the generic data set which then is used for processing.

FIG. 3 shows a diagram of an example of a sample of transaction data according to an embodiment of the present invention. The transaction database furthermore may contain a set of behaviors that describe how the client expects responses to be formed. This includes the format 301, 302, 303, 304, 305, timing and sequence of commands based on the state of the transaction. Once the AL has intercepted the transaction, accessed/decrypted it and mapped the data contained to the generic data set it may hand☐off processing to the Obfuscation Module.

The Obfuscation Module (in short OM) handles determining which data to expose to third parties. To achieve this, the OM may receive the generic data set from the AL. The OM preferably knows several ways on how to obfuscate data. The following options may be available, ranging from completely restricted to the transmission of the full data set:
complete removal of data point
Replacement with random data of the same type (e.g. "32000" becomes "12345")
Replacement with generalized information (e.g. "32000" becomes "10000-50000", "Frank Schmidt, ID 98554, MyBank" becomes "A MyBank Customer")
Replacement with pseudo-anonymized information ("MyBank" becomes "#5656564")
Clear text, no obfuscation applied The OM may apply obfuscation only to parts of a given data point: "Frank Schmidt sends 32000 from MyBank ID 98554 to Lise Meier at NewBank ID 21651" becomes "Frank Schmidt sends 10000☐50000 to A NewBank Customer".

The OM may then determine where the data is delivered and may apply the obfuscation based on a set of rules (see below). The possible targets may be:
"Me" (the customer)
"Bank" (only the handling bank, no third-parties)
"Trusted 3rd-Party" (only 3rd-parties that are known and trusted by the handling bank)
"Public" (anyone that can access the transaction)
The obfuscation presented to "Bank" can therefore be different from the one presented to "Trusted 3rd-Party". For instance the mapping can be like this:
"Me"→Clear Text
"Bank"→Clear Text
"Trusted 3rd-Party"→Replacement with generalized information
"Public"→Complete removal The sensitivity rating can also include a range of possible settings for example "Replacement with pseudo-anonymization or better". This allows participants to specify a maximum of openness that they are willing to work with.

Which data point is mapped to which sensitivity rating preferably depends on customer preference (the bank can provide customization options for their customers), bank defaults, compliance- and legislation-based defaults or general vendor-provided defaults. The hierarchy of these can be different for each, but a general idea can be (highest to lowest):
Compliance/Legislation-based
Bank Defaults
Customer Settings If a higher-order element does not enforce a specific setting, the preferences of the lower order elements may be used (if present).

For example, on the one hand, legislation can enforce that transaction IDs must always be set to "Clear Text", thus a customer setting to have them set to "Bank" may not be applied. On the other hand, if neither Legislation nor Bank require the "Description" to be handled it a specific way, a customer setting of "Complete Removal" can be enforced. Once the mapping is complete the OM may create a new copy of the transaction, apply the obfuscations and indicate the level of obfuscation applied by adding an additional data point listing in a key-value-pair the methods applied. The OM may then hand over the copy of the transaction to the AL to request interaction with the 3rd-Party (fraud screening) service. The AL may use its database of transaction knowledge to craft a transaction based on the modified generic data set that matches the way the 3rd-Party wants to communicate. It may send the request and listen for the following responses:
1. Transaction OKAY
2. Transaction REJECTED
3. More information needed
4. Risk information provided If the Transaction is reported as "OKAY" or "REJECTED" by the 3rd-Party, the AL may communicate such to the bank by requesting a copy of the transaction from the OM that will match the customer's obfuscation settings for communication with the bank. The AL may choose to trigger the Risk Module if communication with the bank requires an obfuscation of the 3rd-Party results or parts of the transaction into a generalized Fraud Vector. The AL may attach 3rd-Party results and/or the Risk Module output to the transaction and hand it over to the banking system. The AL may relay responses to the original client based on the bank's response.

If the transaction is reported as "More information needed" the AL may hand-off the result to the OM. The OM may check the result for any indicators by the 3rd-Party which kind of information is missing or insufficient. This can be done by checking specific error codes received or by using a dedicated data point that indicates the missing/offending information.

Figure 3A:
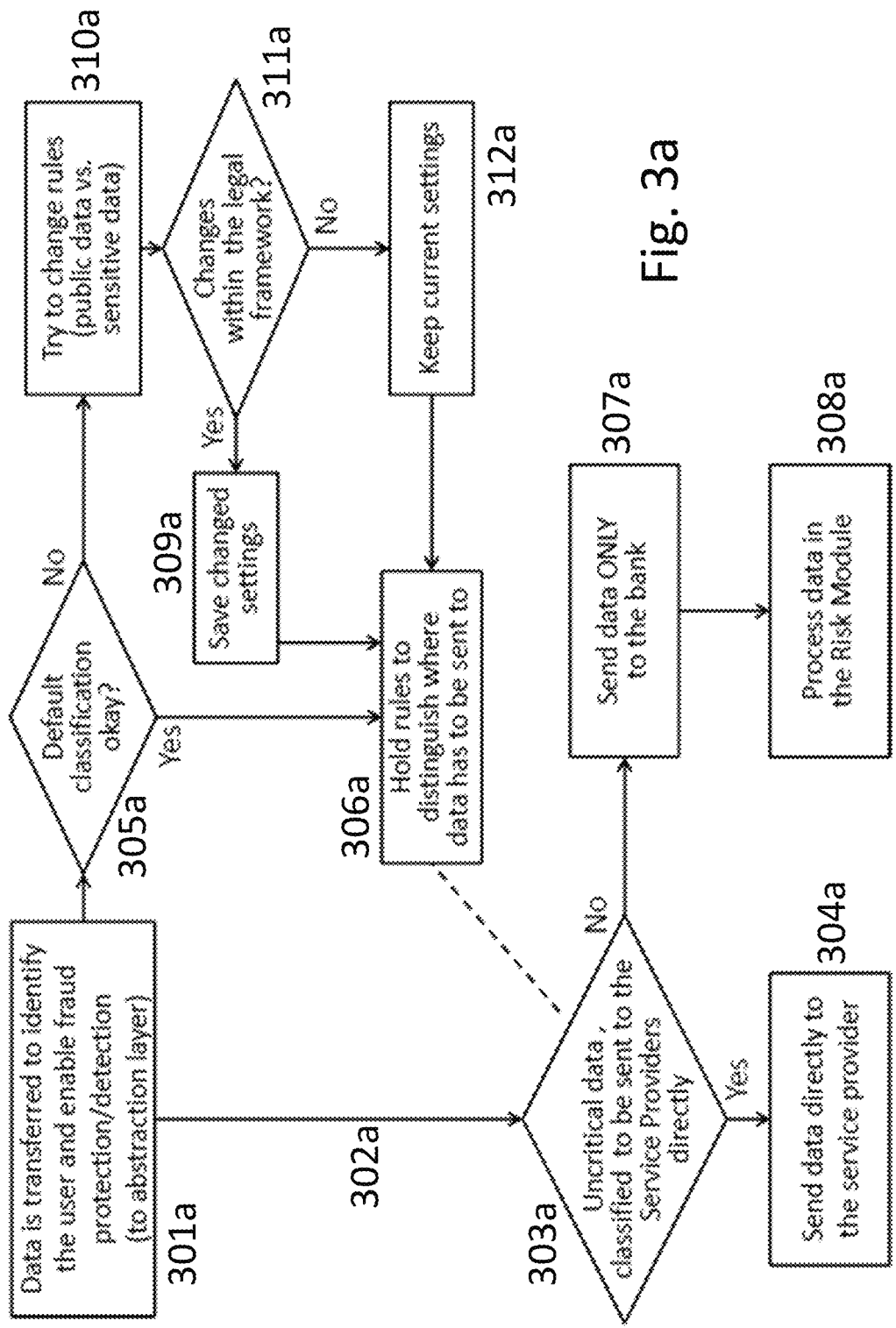
FIG. 3a shows a diagram of a further example of a data flow according to an embodiment of the present invention.

FIG. 3a shows a diagram of a further example of a data flow according to an embodiment of the present invention. In this embodiment data is transferred 301a, 302a, to the abstraction layer AL in order to identify the user and enable fraud protection/detection 303a. In case the fraud protection/detection results in finding uncritical data, these data may be sent 304a to the service provider directly. Otherwise, the data will be sent 307a only to the bank, where the data may be processed 308a by the Risk Module RM.

Rules to distinguish where data have to be sent may be held 306a in the AL. If the default classification appears 305a to be appropriate ("okay"), rules may be left unchanged. If the default classification appears 305a not to be appropriate, rules may be changes 310a, preferably by considering 311a possible changes in the legal framework.

Figure 4:
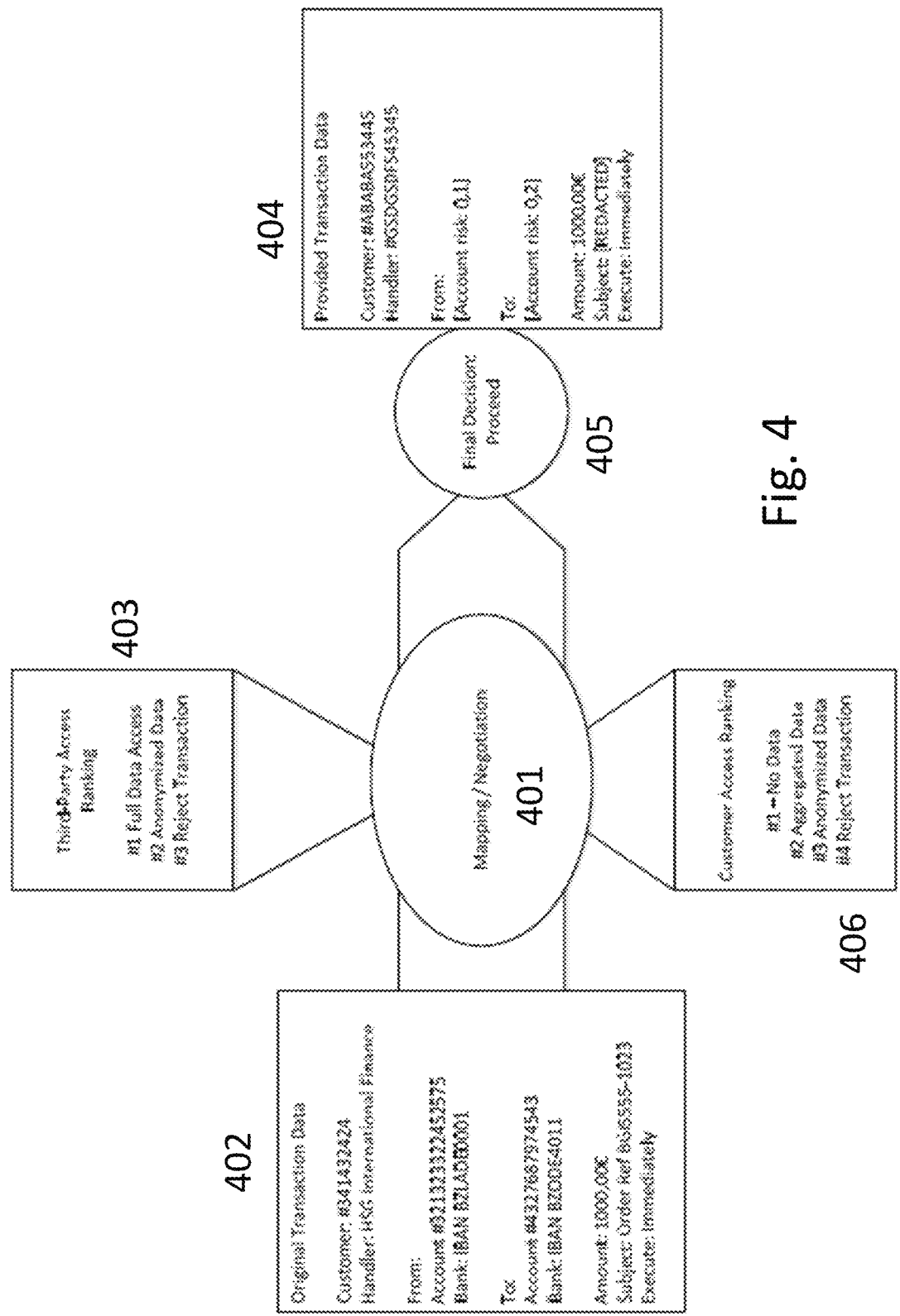
FIG. 4 shows a diagram of an example of a mapping or a negotiation of the obfuscation level according to an embodiment of the present invention.

FIG. 4 shows a diagram of an example of a mapping or a negotiation of the obfuscation level according to an embodiment of the present invention.

If some of the data points have a range of obfuscation preferences available, the OM may check if the 3rd-Party has indicated one of these data points as the issue. If so the OM may check using the provided result if the 3rd-Party has indicated a preferred level of obfuscation (or wants no obfuscation at all). If a specific level was given the OM may check if this is acceptable based on the sensitivity settings. If it is acceptable, data from the original transaction copy may be obfuscated using the new obfuscation preferences and sent to the 3rd-Party via the AL for re-evaluation. If this is not acceptable, the OM may send a signal back to the AL that the transaction cannot be completed automatically. The AL may then abort the transaction or request (interactive) feedback from the client to check if it is permissible to follow the 3rd-Party's request for less obfuscation on that specific data point.

If the 3rd-Party does not pass a specific judgement on the transaction but "just" additional risk information the AL may now trigger the Risk Module. The AL may hand over the 3rd-Party results and the original transaction and may ask the Risk Module for an evaluation and generation of the Fraud Vector.

The Risk Module (in short RM) works like a combination of the OM and a 3rd-Party fraud screening service in that it is able to analyze and combine findings that indicate risk and communicates the results in an aggregated way. The results do no longer contain the actual findings but only the meaning for the bank, e.g. "in case a specific aspect of the transaction suspicious" act accordingly. Instead of sending the complete information about the transaction a fraud vector is transmitted which describes the transaction without revealing all details.

A potential fraudulent transaction exhibits one or more characteristics:
An extraordinary high sum
A payee account located in a suspicious country
Unknown payee
Between two 'critical' flagged accounts (→already on watch list)

In all these examples the remittee (account number and bank ID) may be added to the general watch list of the bank. An example for the Fraud vector would be (1, 3, 80), which means,
1: additional risk is present (0 would mean, no additional risk)
3: amount of indicators have been found, e.g. three additional risk indicators
80: riskiness of the transaction (in short: TA) (the risk score that has been determined by the risk module RM) may be added to the suspicious remittees on the watch list (values between 0 and 100 are valid). The RM provides the fraud vector as shown in the diagram below.

Figure 5:
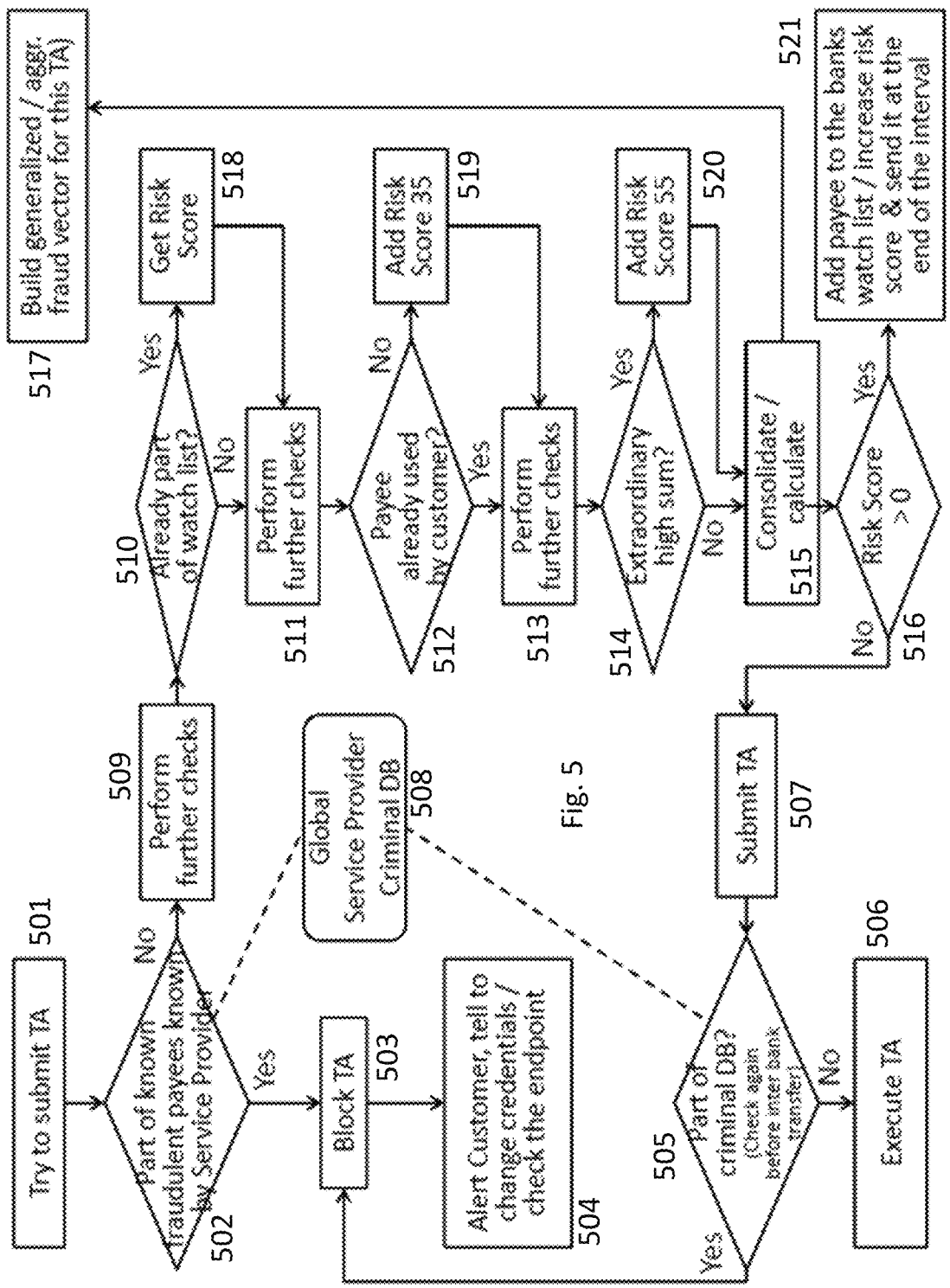
FIG. 5 shows a diagram of an example of an analysis of a transaction by the Risk Module according to an embodiment of the present invention.

FIG. 5 shows a diagram of an example of an analysis of a transaction by the Risk Module according to an embodiment of the present invention. User 501 tries to submit a transaction TA. Using a global service provider criminal data base 508, fraudulent payees may be detected 502 and the TA may be blocked 503. The customer may be alerted 504 and enabled to change credentials or check the endpoint. Further checked 509, 511, 513 may be performed otherwise. A risk score may be assessed 518, 519, 520, calculated or consolidated 515 and a fraud vector may be built 517 or increased 521 for this TA or the payee may be added 521 to the banks watch list. Finally, the TA may be submitted to the RM again for a repeated check 505 with the criminal data base before actually executing the TA 506.

Note that these indicators can include external sources that may be triggered based on the transaction content (e.g. account numbers) but are counted as individual indicators. For example, an account number matching both the global criminal database and the bank's internal database counts as two indicators. The Fraud Vector can also contain risk ratings for each data point of the transaction if an evaluation of this data point can be made. These individual ratings ca also be suppressed if not needed or the customer opts not to share details with the bank. A possible RM result could therefore be:

```
<fraud vector rating="1, 3, 80">
<payee rating="10" />
<recipient rating="56" />
<transaction value rating="67" />
<.... />
</fraud vector>
```

The possible checks are not limited to the named indicators but exemplary for our approach. Another indicator could be the frequency of money transfers of a bank account—of the remittee and as well of the remitter. The RM may make use of the OM and AL to query additional 3rd-Party services and databases during its evaluation. This is to ensure the customer's privacy is maintained even during the RM's evaluation.

The following three use cases illustrate the communicating between the entities user, AL, RM and service provider according to embodiments of the invention.

Figure 6:
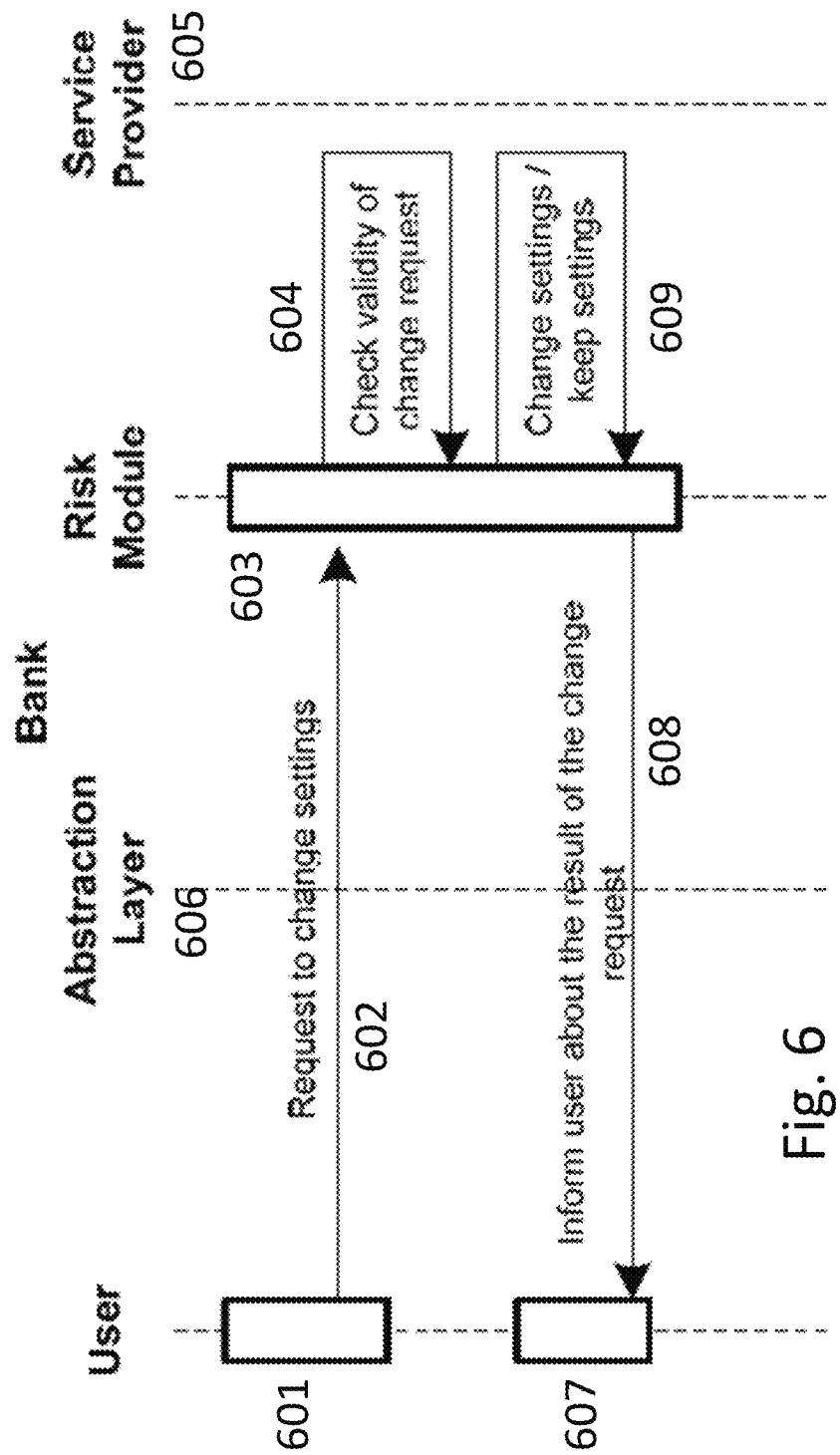
FIG. 6 shows a diagram of an example of an interaction between user and the Risk Module to change setting of the privacy controls according to an embodiment of the present invention.

FIG. 6 shows a diagram of an example of an interaction between user and the Risk Module to change setting of the privacy controls according to an embodiment of the present invention.

User 601 sends a request 602 to change settings to the risk module 603. The risk module 603 may check the validity 604 of the user request 602 to ensure that the change request is in line with the bank policies and the legal regulations. The risk module RM decides 609 to change settings or to keep settings and informs 608 the user 607 about the result of the change request.

Figure 7:
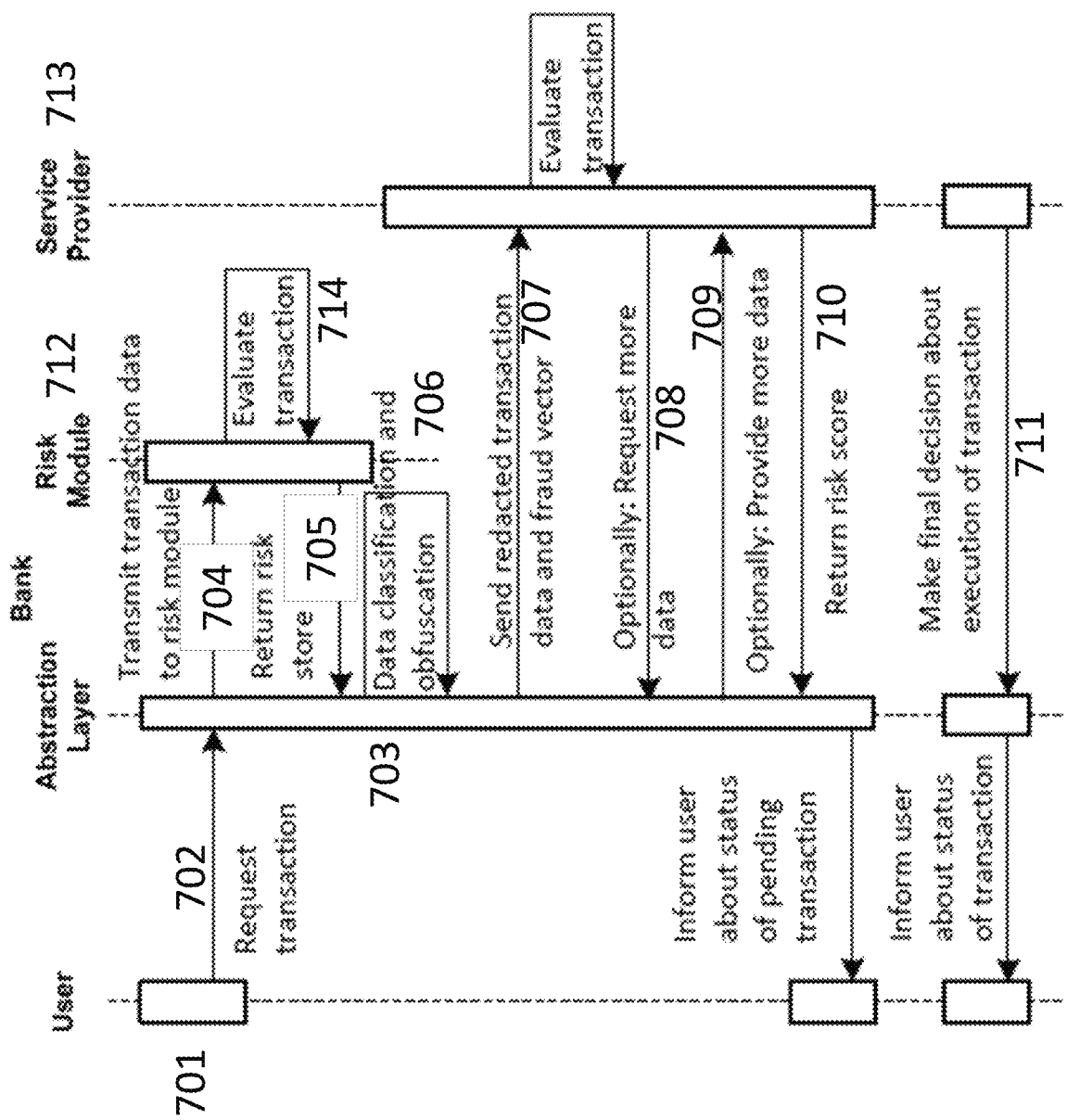
FIG. 7 shows a diagram of an example of an interaction to screen a transaction and to provide a risk score according to an embodiment of the present invention.

FIG. 7 shows a diagram of an example of an interaction to screen a transaction and to provide a risk score according to an embodiment of the present invention. User 701 sends a transaction request 702 to the abstraction layer 703, from where the transaction data may be transmitted 704 to the risk module 712, which may evaluate 714 the transaction and return 705 a risk score to the abstraction layer 703. The abstraction layer 703 may perform a data classification and obfuscation 706, after which redacted transaction data and preferably a fraud vector may be sent 707 to the service provider 713 for an evaluation of the transaction. Optionally, more data may be requested 708 by the service provider form the abstraction layer and optionally, more data may be provided 709 to the service provider by the transaction layer.

Finally, a risk score may be returned 710 by the service provider to the abstraction layer and a final decision may be made about the execution of the requested transaction and sent 711 to the abstraction layer. The abstraction layer then may inform the user about the status of the requested transaction.

As shown in this figure the AL and RM may perform the classification and obfuscation of transaction data according to the user settings before the data is forwarded to the service provider. Pending transactions between banks may be executed typically once a day at bank closing hour. It is possible that a pending transaction is eventually blocked when similar transactions (e.g. to the same payee) are detected as fraud.

FIG. 8 shows a diagram of an example of an exchange and update of a watch list according to an embodiment of the present invention. Abstraction layer 802 and service provider 805 communicate 806, 807 or exchange a watch list. The data may be incorporated 810 into a list of mule accounts by the service provider 805, which is provided 808 to the service provider and 809 to the risk module 804 by the abstraction layer 802. As shown in this figure both entities the RM 804 and the service provider 805 may benefit from the (e.g. daily) exchange 806, 807 of the watch list.

By using the AL to intercept transactions, using the OM to apply rules-based obfuscation of data and finally using the RM to perform an in-depth risk analysis resulting in a generalized Fraud Vector, embodiments of the invention are able to ensure transactions are properly screened for fraud without surrendering the customer's data. Customer data may be protected using a granular approach, uncovering more data as needed/permitted, requesting consent or aborting the transaction if too much information might be exposed. Bank interests may be protected as it is provided with the actionable information and evaluation it can use to determine if a given transaction is permissible. As most of the data is just a means to arrive at a certain risk rating, reducing the information transmitted to this specific delivery allows faster, more privacy-conscious screening without losing precision.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for transaction processing, the method comprising:
    capturing, by an abstraction layer executing on a processor, a transaction request and process the transaction request, wherein processing the request includes authenticating a source of the transaction request;
    creating, by the abstraction layer, a data set for the transaction based on the processing of the transaction request, the data set including financial data of a customer requesting the transaction;
    determine a destination of the transaction request;
    obfuscating at least one data item in the data set, wherein the at least one data item and a type of obfuscation are determined based at least in part on the destination of the transaction request and upon a user preference, wherein the user is the customer requesting the transaction and wherein the user is identified based upon the extracted data;
    creating an updated transaction request including the data set having the obfuscations;
    providing the updated transaction request to the destination;
    receiving a request to reduce a level of obfuscation of the at least one data item;
    based on a determination that the user preference is to not provide the at least one data item at the level of requested obfuscation to the destination, aborting the transaction request in response to the request; and
    based on a determination that the user preference is to provide the at least one data item at the level of requested obfuscation to the destination, providing the updated transaction request having the level of requested obfuscation to the destination.

2. The method of claim 1, wherein the at least one data item and the type of obfuscation are further determined based at least in part on a user preference, wherein the user is identified based upon the extracted data.

3. The method of claim 1, wherein the type of obfuscation include one of a removal of the at least one data item, a replacement of the at least one data item with a random data of a same type, a replacement of the at least one data item with generalized information, and a replacement of the at least one data item with pseudo-anonymized information.

4. The method of claim 1, wherein the destination is one of a customer associated with the transaction request, a counter party associated with the transaction request, a trusted third party, and a public party.

5. A method for transaction processing, the method comprising:
    capture a transaction request and process the transaction request;
    creating a data set for the transaction based on the processing of the transaction request, the data set including financial data of a customer requesting the transaction;
    determining a destination of the transaction request;
    obfuscating at least one data item in the data set, wherein the at least one data item and a type of obfuscation are determined based at least in part on the destination of the transaction request and upon a preference of the customer requesting the transaction;
    creating an updated transaction request including the data set having the obfuscations;
    providing the updated transaction request to the destination;
    receiving, from the destination, a request to reduce a level of obfuscation of the at least one data item; and
    based on a determination that the user preference is to not provide the at least one data item at the level of requested obfuscation to the destination; aborting the transaction request in response to the request.

* * * * *